United States Patent
Shimizu et al.

(10) Patent No.: US 7,172,747 B2
(45) Date of Patent: Feb. 6, 2007

(54) METAL OXIDE NANOTUBE AND PROCESS FOR PRODUCTION THEREOF

(75) Inventors: Toshimi Shimizu, Ibaraki (JP); John Hwa Jung, Ibaraki (JP)

(73) Assignees: Japan Science and Technology Agency, Saitama (JP); National Institute of Advanced Industrial Science and Technology, Tokyo (JP)

( * ) Notice: Subject to any disclaimer, the term of this patent is extended or adjusted under 35 U.S.C. 154(b) by 244 days.

(21) Appl. No.: 10/502,562

(22) PCT Filed: Mar. 26, 2003

(86) PCT No.: PCT/JP03/03755

§ 371 (c)(1),
(2), (4) Date: Jul. 22, 2004

(87) PCT Pub. No.: WO03/099713

PCT Pub. Date: Dec. 4, 2003

(65) Prior Publication Data

US 2005/0077496 A1    Apr. 14, 2005

(30) Foreign Application Priority Data

May 24, 2002    (JP) .............................. 2002-150356

(51) Int. Cl.
C01B 33/113    (2006.01)
C01G 1/00    (2006.01)
C01G 23/00    (2006.01)
C01G 25/00    (2006.01)

(52) U.S. Cl. ............................... 423/592.1; 423/593.1; 423/610; 423/608; 423/325; 423/335; 423/598; 423/594.12; 423/338; 502/400; 502/407; 206/0.7; 977/811; 977/963

(58) Field of Classification Search ............. 423/592.1, 423/593.1, 610, 608, 325, 335, 598, 594.12, 423/338; 502/400, 407; 206/0.7; 977/811, 977/963

See application file for complete search history.

(56) References Cited

U.S. PATENT DOCUMENTS 6,960,334 B1    11/2005   Matsui et al.
2005/0036939 A1*  2/2005   Wong et al. ................. 423/598

FOREIGN PATENT DOCUMENTS

| EP | 1 146 013 A1 |   | 10/2001 |
|----|--------------|---|---------|
| EP | 1 246 219 A1 | * | 10/2002 |
| JP | 2001-253705  |   | 9/2001  |
| JP | 2002-159848  |   | 6/2002  |
| JP | 2003-049154  |   | 2/2003  |
| JP | 2003-261331 A | * | 9/2003 |
| WO | WO 2004/011375 A1 | * | 2/2004 |

OTHER PUBLICATIONS

G. John, M. Masuda, Y. Okada, K. Yase and T. Shimizu, "Nanotube Formation from Renewable Resources via Coiled Nanofibers", Advanced Materials, 2001, vol. 13, No. 10, pp. 715-724.
Masuda, M.; Hanada, T.; Okada, Y.: Yase, K.; Shimizu, T., "Polymerization in Nanometer Sized Fibers: Molecular Packing Order and Polymerizability", MACROMOLECULES, 2000, vol. 33, pp. 9233-9238.
Nakazawa, I.; Masuda, M.; Okada, Y.; Hanada, T.; Yase, K.; Asai, M.; Shimizu, T., "Spontaneous Formation of Helically Twisted Fibers from 2-Glucosamide Bolaamphiphiles: Energy-Filtering . . . ", LANGMUIR, 1999, vol. 15, pp. 4757-4764.
Shimizu, T.; Masuda, M., "Stereochemical Effect of Even—Odd Connecting Links on Supramolecular Assemblies Made of 1-Glucosamide Bolaamphiphiles", Journal of the American Chemical Society, 1997, vol. 119, pp. 2812-2818.
Richter, J.; Seidel, R.; Kirsch, R.; Merting, M.; Pompe, W.; Plaschke, J.; Schacker, H., "Nanoscale Palladium Metallization of DNA", Advanced Materials, 2000, vol. 12, pp. 507-513.
Jung, J.H.; Ono, Y.; Shinkai, S., "Novel Silica Strutures which are prepared by Transcription of Various Superstructures formed in Organogels", LANGMUIR, 2000, vol. 16, pp. 1643-1649.
Chen, P.; Wu, X.; Lin, J; Tan, K.L., "High H2, Uptake by Alkali-Doped Carbon Nanotubes Under Ambient Pressure and Moderate Temperatures", SCIENCE, 1999 vol. 285 pp. 91-93.

* cited by examiner

Primary Examiner—Timothy C. Vanoy
(74) Attorney, Agent, or Firm—Gary C Cohn PLV

(57) ABSTRACT

Spiral shaped fibers were utilized to prepare completely novel metal oxide nanotubes comprising solely metal oxides. The metal oxide nanotubes comprise solely a hollow cylinder shaped metal oxide which may contain hydroxyl groups constituting a double helix and having hole diameter distributions containing two peak hole diameters ranging from 1 to 2 nm and from 3 to 7 nm. The tubes may be obtained by forming spiral shaped fibers from a solution of compound 1

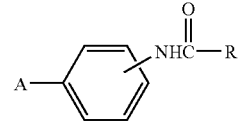

(chemical formula 1)

and compound 2

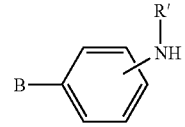

(chemical formula 2)

and using the fibers as a template for making the nanotubes. The hydrogen adsorption and storage capacity of the metal oxide nanotubes are extremely good.

28 Claims, 4 Drawing Sheets

METAL OXIDE NANOTUBE AND PROCESS FOR PRODUCTION THEREOF

TECHNICAL FIELD

The present invention relates to metal oxide nanotubes consisting solely of a metal oxide manufactured by using a hydrogel comprising a self aggregating organic compound as a template, more specifically, to metal oxide nanotubes having hollow cylinder micro structures constituting a metal oxide and having a capability to adsorb and store gas, particularly, a capability to adsorb and store hydrogen.

PRIOR ART

The inventors have been conducting research on the formation of nanometer sized aggregates through self aggregation in solution of organic materials having specific structures. (John, G,; Masuda, M; Okada, Y.; Yase, K.; Shimizu, T. Adv. Mater. 2001, 13, 715: Masuda, M.; Hanada, T.; Okada, Y.; Yase, K.; Shimizu, T. Macromolecules 2000, 33, 9233.: Nakazawa, I.; Masuda, M.; Okada, Y.; Hanada, T.; Yase, K.; Asai, M.; Shimizu, T. Langmuir 1999, 15, 4757.: Shimizu, T.; Masuda, M. J. Am. Chem. Soc. 1997, 119, 2812.: Japanese Patent Application 2001-239014: Japanese Patent Application 2001-248636.) During such research, nanotubes having excellent abilities to adsorb and store gases, particularly, the capacity to adsorb and store hydrogen, were discovered.

Carbon nanotubes, carbon fibers and the like having nanometer sized spaces and voids have been known as materials having such ability to adsorb and store hydrogen. (WO 00/40509. Japanese Patent Provisional Publication 2002-54559.) In particular, some of the carbon nanotubes displayed hydrogen adsorption and storage capacities of 4% by weight to 8% by weight in some experimental examples, but their problems included high pressure conditions that made them impractical to use, measurements made at liquid nitrogen temperatures and the inability to perform the function repeatedly since they were used only under irreversible conditions. [For example, J. Richter, R. Seidel, R. Kirsch, M. Merting, W. Pompe, J. Plaschke, H. Schacker, Adv. Mater., 12, 507 (2000). P. Chen, X. Wu, J. Lin, K. L. Tan, Science, 285, 91 (1999).]

In general, a hydrogen adsorption and storage capacity of about 3% by weight is considered necessary for an ordinary passenger vehicle to store the hydrogen gas needed to travel 500 km, and this is an accepted practical target level. However, reported hydrogen adsorption and storage capacities included about 3% by weight or less for single layer carbon nanotubes, about 1.5% by weight or less for carbon fibers and about 0.6% by weight for activated carbon although some inconsistencies existed, and the goal has hardly been achieved. Furthermore, single layer and multiple layer carbon nanotubes have many problems that need to be solved. For example, they are very expensive and are not adaptable to large volume production.

Hydrogen adsorbing and storing alloys, mesoporous materials, porous organic materials and the like having nanometer sized voids are also known as hydrogen adsorbing and storing materials (Japanese Patent Provisional Publication 2002-105609), but their performance as far as hydrogen adsorption and storage capacity is concerned has not reached the level adequate for practical applications. This is particularly true of hydrogen adsorbing and storing alloys which have high specific gravity, toxicity, contain a rare and expensive metal as an active ingredient or disintegrate into fine powder upon adsorption and desorption of hydrogen leaving many problems unsolved.

Problems for the Invention to Solve

Research on a nanometer sized aggregate formed in a solution through self aggregation of an organic material having a specified structure revealed the metal oxide nanotubes of the present invention, and the present invention offers nanotubes that can be manufactured easily and inexpensively in large quantities, used repeatedly and have the capacity to adsorb and store gases, particularly about 3% by weight of hydrogen.

Means to Solve the Problem

The inventors had already discovered that spiral shaped fibers were obtained through the self aggregation in water of the compound represented by the chemical formula (Chemical Formula 1) shown below

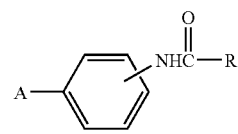

(in which formula A represents a saccharide radical and R represents an alkyl group) (Japanese Patent Application 2001-239014). The inventors discovered that nanotubes consisting solely of a metal oxide could be prepared by utilizing this spiral shaped fiber, and the present invention was complete.

That is, spiral shaped fibers are similarly formed when a portion of Compound (1) is substituted by Compound (2) represented by the chemical formula (Chemical Formula 2) shown below

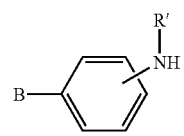

(in which formula B represents a saccharide radical and R' represents a hydrogen atom or an alkyl group). A precursor of a metal oxide is adsorbed on the surface of the spiral shaped surface due to hydrogen bonding of the amino groups [the primary amino groups (—$NH_2$) and the secondary amino groups (—NRH)] and the precursor when a precursor (for example, an alkoxide) of a metal oxide is added. As a result, an aggregate comprising a metal oxide precursor constructed to surround the spiral shaped fiber is formed using the spiral shaped fiber as a template.

By adding a catalyst that catalyzes the reaction to form a metal oxide (that is, a structural material binding a metal through an ether type oxygen) from the metal oxide precursor, a metal oxide structural material is formed using the spiral shaped fiber as the template. In this state, a gel comprising a metal oxide and the aforementioned organic compound [spiral shaped fibers comprising Compound (1) and Compound (2)] is formed, and nanotubes comprising solely the metal oxide are formed upon removing the organic material by sintering at high temperatures.

That is, the present invention is a metal oxide nanotube consisting solely of a metal oxide that may contain hydroxyl groups, which is constructed in a double spiral and a hollow cylinder and has a hole diameter distribution containing two peak hole diameters ranging from 1 to 2 nm and from 3 to 7 nm. That is, the nanotube of the present invention has two hollow cylinder nanotubes having a hole diameter distribution with a peak hole diameter of 1–2 nm, particularly 1.2–1.5 nm, constructing a double spiral having a peak distance between nanotubes ranging 3–7 nm, particularly 4–6 nm. The hole diameter distribution is determined according to Brunauer-Emmett-Teller (BET) method.

The metal oxide nanotube are preferably formed in water or a mixed solution of water and alcohol by dissolving compound 1 represented by the chemical formula (chemical formula 1) shown below

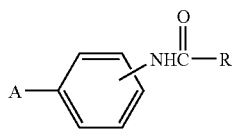

and compound 2 represented by the chemical formula (chemical formula 2) shown below

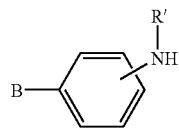

(in the formula A and B, may be identical or different from each other, represent saccharide radicals, R represents an alkyl group and R' represents a hydrogen atom or an alkyl group) in water or a mixed solution of water and alcohol and allowing to stand.

In the formulae above, A and B may be identical or different from each other and represent saccharide radicals. In addition, A and B being identical saccharide radicals is preferred for efficient formation of spiral shaped fibers. The saccharide may be monosaccharides, oligosaccharides or polysaccharides, but monosaccharides are preferred. As the monosaccharides, any one of glucose, galactose, N-acetyl glucosamine and other hexose, L-arabinose, xylose and other pentose may be used, but aldopyranose is particularly preferred. Pyranose is available in two types, α and β, and either one may be used. As the aldopyranose, glucopyranose, galactopyranose, mannopyranose, allopyranose, altropyranose, gulopyranose, idopyranose, talopyranose and the like may be used. As the aldopyranose, glucopyranose or galactopyranose is preferred.

In addition, the term radical refers to a radical from which a hydrogen from one of the hydroxyl groups of saccharide has been removed, but a radical obtained by removing a hydrogen from any one of the hydroxyl groups bonded to the six membered aldopyranose ring is preferred.

In addition, the alkanoylamino group (—NHCOR) in Compound (1) may be located at any one of o-, m- or p-positions in relation to the saccharide radical (A), but the para position is preferred. The amino group (—NR'H) in Compound (2) may be located at any one of o-, m- or p-position in relation to the saccharide radical (B), but the para position is preferred.

The R in the Chemical Formula (1) shown above represents an alkyl group. This alkyl group may contain linear or branched chains, but linear chains are preferred. The number of carbon atoms is preferable six to twenty, more preferably ten to twenty, and even more preferably ten to fourteen. As such alkyl groups, the dodecyl group, tridecyl group, tetradecyl group, pentadecyl group, hexadecyl group and the like, for example, may be used.

In addition, R' in the Chemical Formula (2) shown above represents a hydrogen atom or an alkyl group, but a hydrogen atom is preferred. As the alkyl group, those containing four or fewer carbon atoms are preferred, and linear chains are more preferred.

Compound (2) can be obtained using an ordinary method of reducing a corresponding nitrophenyl aldopyranoside, and Compound (1) may be obtained by allowing a long chain alkyl fatty acid chloride to react with Compound (2).

The metal oxide may be a metal oxide with its precursor adsorbed on the amino groups on the surface of spiral shaped fibers formed from Compounds (1) and (2). Th metal may be Si, Ti, Zr, Zn, Ba, Ca, Ni, Al, Nb, Ta, W, Hf, Sn, Ge, Mn, Th, Ce or U or mixtures thereof, preferably Si, Ti, Zr, Zn, Ba, Ca, Ni, Al, Nb, Ta, W, Hf or Sn or mixtures thereof, and even more preferably Si, Ti or Zr or mixtures thereof.

Here, a metal oxide does not necessarily need to be represented by compositional formulae such as ZnO, $BaSO_4$, $CaCO_3$, $NiO_2$, $Al_2O_3$, $NbO_5$, $WO_3$, $HfO_2$, $SnO_2$, $SiAlO_{3.5}$, $SiTiO_4$, $ZrTiO_4$, $AlTiO_5$, $ZrW_2O_8$, $SiO_2$, $GeO_2$, $TiO_2$, $MnO_2$, $ZrO_2$, $ThO_2$, $CeO_2$ or $UO_2$, and those containing hydroxyl groups also may be included.

For example, four types of structures surrounding the silicon atom (Q1, Q2, Q3 and Q4) are available in the silicon oxide obtained from alkoxy silica. In one of them, all four bonds are connected to oxygen atoms which in turn are connected to adjacent silicon atoms (Q4). The second type has one of the four bonds terminated with a hydroxyl group and others connected to oxygen atoms (Q3). The third type has two bonds terminated with hydroxyl groups and the remaining two bonds connected to oxygen atoms (Q2). The last type has three bonds terminated with hydroxyl groups and the remaining bond connected to an oxygen atom (Q1). An examination of the silicon atoms using NMR can distinguish these structures and relative proportions. In the case of the silica nanotubes of the present invention, Q4/Q3 values are between 2 and 6.

The inventors discovered that the metal oxide nanotubes are capable of adsorbing and storing gases, particularly hydrogen, which is considered to be attributed to having the aforementioned hole diameter distribution. That is, the present invention is a gas adsorption—desorption and storage material comprising any one of the aforementioned metal oxide nanotubes. More specifically, the present invention is a hydrogen adsorption and storage material wherein the gas is hydrogen.

EMBODIMENT OF THE INVENTION

Figure 1:
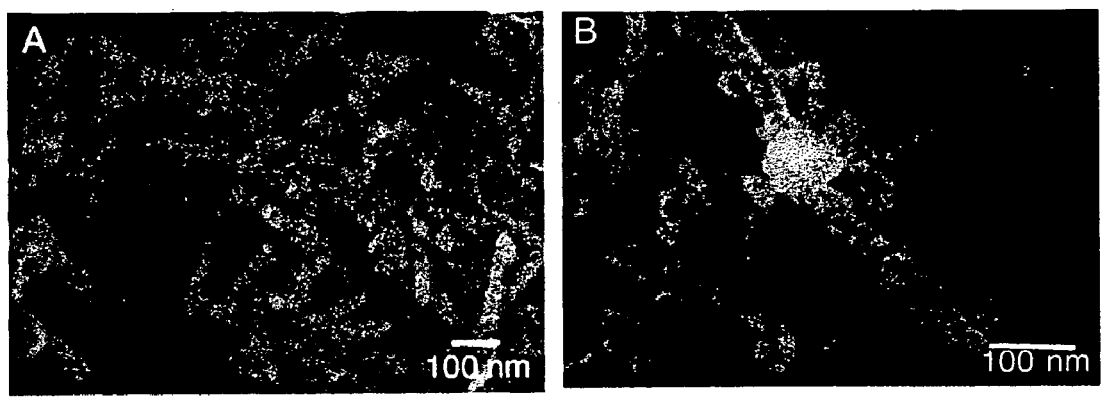
FIG. 1A shows a field emission scanning electron microscope photograph of the double spiral silica nanotubes obtained in Example 1.
FIG. 1B shows a second field emission scanning electron microscope photograph of the double spiral silica nanotubes obtained in Example 1, at a higher level of magnification than that shown in Figure 1A.

The production process for the metal oxide nanotubes of the present invention comprises a step (first step) wherein Compound (1) represented by the chemical formula (Chemical Formula 1) shown below

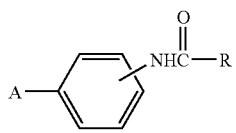

and Compound (2) represented by the chemical formula (Chemical Formula 2) shown below

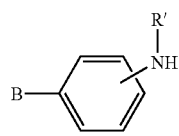

(in the formulae, A, B, R and R' are as defined above) are allowed to dissolve in water or a mixed solution of water and alcohol and allowed to stand, a step (second step) wherein a metal oxide precursor is further mixed, a step (third step) wherein a catalyst designed to further convert the metal oxide precursor to a metal oxide is mixed and a step (fourth step) wherein the gel formed in the previous step is sintered. The first step through the fourth step is executed in this order.

In the first step, Compound (1) and Compound (2) are mixed and dissolved in water or a water/alcohol mixed solvent. Conducting the first step in a mixed solution of water and alcohol is preferred. The number of carbon atoms in the alcohol is preferably four or less, and methanol, ethanol and propanol are preferred. The proportion of alcohol in the mixed solution is preferably 10 to 50% by weight. When too much alcohol is present in the mixed solution, gel formation does not occur and the components remain dissolved resulting in difficulties in forming extra fine molecular aggregates of spiral shaped fibers effective as templates. When the alcohol component concentration in the mixed solution is too low, individual components encounter difficulty dispersing and dissolving effectively.

The appropriate concentration of Compound (1) and Compound (2) in the solvent (a mixed solution) is about 1 to 20 g/liter, but about 5 to 10 g/liter is preferred.

A molar ratio of Compound (2) to the sum of Compound (1) and Compound (2) of at least 20% is appropriate, and 20 to 90 mol % is preferred. When this ratio is too low, the molecular aggregate obtained is granular and has difficulty forming fibrous aggregates. Based on the composition analyses of the molecular aggregates obtained, about 20% of Compound (2) was found to be present regardless of the ratio at which the components were mixed. In order to obtain the desired hollow cylinder shaped micro oxide structural material in good efficiency, the presence of 40 to 50% of Compound (2) in an entire solution is most desirable.

Slight heating may be used in the first step to accelerate dissolution of Compound (1) and Compound (2). The solution is preferably allowed to stand subsequently at room temperature for spiral shaped fibers to form through self coagulation of Compound (1) and Compound (2). The time needed for the spiral shaped fibers to form can be established upon observing the gel formation and is ordinarily within half a day.

A metal oxide precursor is blended in the second step after spiral shaped fibers are formed. This metal oxide precursor may be in any form as long as it forms the aforementioned metal oxide, but metal alkoxides are preferred and alkoxides containing silicon, titanium or zirconium are more preferred. For example, tetraethoxysilane, tetrapropoxysilane, tetrabutoxysilane, (chloromethyl) triethoxysilane, diethoxymethylsilane, diethoxyisopropylsilane, aminopropyl triethoxysilane, titanium derivatives of these compounds and zirconium derivatives of these compounds may be cited. Tetraethoxysilane, tetraethoxy titanium and tetraethoxy zirconium are preferred based on the ease of raw material availability and the cost.

When a metal oxide precursor is added at this step, the metal oxide precursor is adsorbed on the surface of the molecular aggregates (spiral shaped fibers) formed in the previous step. That is, the anion, a metal oxide precursor, becomes strongly adsorbed on an aggregate surface in this step through the hydrogen bonding and electrostatic interactions with Compound (2) partially incorporated into the molecular aggregate (spiral shaped fibers).

The ratio of the metal in a metal oxide precursor to Compound (1) is preferably 10 to 150 fold equivalent, but 10 to 100 fold equivalent is more preferred. The mixed reaction solution is allowed to stand for about a day to 10 days at room temperature. The longer the standing period, the greater the adsorption rate of the metal oxide precursor on the surface of the spiral shaped fiber molecular aggregate and the thicker the hollow cylinder micro metal oxide structure material obtained after sintering. 4 to 8 days is ideal.

The metal oxide precursor is allowed to polymerize to form a metal oxide in the third step. As described above, this metal oxide may contain hydroxyl groups. A basic catalyst is desirable for this polymerization, and ethylamine, propylamine, butylamine, pentylamine, hexylamine, benzylamine, diethylamine, dipropylamine, dibutylamine, dipentylamine, dihexylamine, ammonium hydroxide, alkali metal hydroxides and the like may be cited. The amount of catalyst used may be in about the same weight ratio as that of Compound (1) charged. In addition, a pH value of about 4 to 10 is appropriate, but 7 to 10 is optimum.

In executing the first step to the third step, the most preferred approach is to conduct the next step upon completion of the previous step. However, the next step may be conducted prior to the completion of the previous step or before confirming the completion.

In the fourth step, a sintering reaction is conducted to eliminate and remove the organic material from the product of the third step. Using this treatment, metal oxide nanotubes comprising solely metal oxide are obtained using molecular aggregates (spiral shaped fibers), an organic material, as templates.

First, the product from the third step is heated for about two hours at 100 to 200° C., and the temperature is subsequently raised to 500° C. These procedures are preferably conducted in a nitrogen gas atmosphere. The reason the sintering reaction is initially conducted at relatively low temperatures is to allow water and alcohol present as the solvent to evaporate slowly at first.

The sintering is subsequently allowed to continue for 4 to 6 hours at 500° C. in air. The sintering time is largely dependent on the sample amount and the sintering device capability. Several hours are needed when a small device and milligram sized samples are used, but several days of sintering is needed when the samples are in the order of grams.

Effect of the Invention

In the present invention, completely novel nanotubes comprising solely metal oxide were successfully prepared by utilizing spiral shaped fibers already discovered (Japanese Patent Application 2001-239014). The metal oxide nanotubes are extremely useful as gas adsorption and storage materials, particularly to adsorb and store hydrogen. As shown by the examples, the hydrogen adsorption and storage capacity per unit volume of the metal oxide nanotubes is extremely high. Therefore, the metal oxide nanotubes are useful in hydrogen manufacturing, storing, transporting and utilization technologies. The utility value is very high, particularly as storage related materials used in hydrogen electrical generation facilities, as fuel storage materials used in hydrogen fueled vehicles, as fuel cell materials and in other energy and environment related areas.

The present invention is illustrated by using the examples below, and it is not intended to restrict the present invention by these. In the examples shown below, the spiral shaped fibers formed and the nanofibers were examined using EF-TEM (a transmission type electron microscope equipped with energy filters) (Nakazawa, I.; Masuda, M.; Okada, Y.; Hanada, T.; Yase, K.; Asai, M.; Shimizu, T. Langmuir 1999, 15, 4757), NMR, FT-IR and XRD. The Rf value obtained by using a hexane/ethyl acetate (volume ratio 6/4) mixed solvent as the developing solvent was defined as Rfi for thin layer chromatography.

PRODUCTION EXAMPLE 1 p-Nitrophenyl-β-D-glucopyranoside (Tokyo Kasei) (250 mg) was dissolved in methanol/tetrahydrofuran mixed solvent (20 ml/5 ml), and 10% palladium carbon (250 mg) was added to the solution. Hydrogen gas was introduced into the reaction solution for three hours under a nitrogen gas atmosphere at room temperature. The reaction mixture was filtered to remove the palladium carbon, and the filtrate was evaporated under vacuum to dry. The solid residue was purified using silica gel chromatography using tetrahydrofuran/chloroform mixed solvent (1/1, volume ratio) as the elution solution to obtain p-aminophenyl-β-D-glucopyranoside.

Yield 80–90%;
$^1$H NMR (300 MHz, DMSO-$d_6$): δ=3.44–4.10 (m, 6H), 4.76 (s, 2H), 5.25–5.31 (m, 3H), 5.60 (s, 1H), 6.70 (d, J=9.0 Hz, 2H), 6.95 (d, J=9.0 Hz, 2H), 7.37–7.46 (m, 5H); FT-IR (KBr): ν=3312, 2909, 1635, 1510, 1364, 1217, 1089, 1005, 1035, 999, 806, 706 cm$^{-1}$; MS (NBA): m/z: 360 [M+H]$^+$;

Elemental analysis:
Calculated (%) for $C_{19}H_{21}NO_6$: C, 63.50; H, 5.89; N, 3.90.
Experimental: C, 63.18; H, 6.04; N, 3.78.

The p-aminophenyl-β-D-glucopyranoside (250 mg) obtained in the manner described above was dissolved in tetrahydrofuran (20 ml), and lauroyl chloride (300 mg) and triethylamine (1.0 g) were added. The reaction mixture was refluxed for five hours. The reaction solution was filtered to remove the solids, and the filtrate was evaporated under vacuum to provide solids. The residue was purified using silica gel column chromatography using methanol/chloroform (1/1, volume ratio) as the elution solution to obtain dodecanoylaminophenyl-β-D-glucopyranoside.

Yield 80%;
$^1$H NMR (300 MHz, CDCl$_3$): δ=0.9 (t, 3H), 1.5–3.0 (m, 15H), 3.50–4.13 (m, 6H); 4.76 (s, 2H), 5.25–5.31 (m, 3H), 5.63 (s, 1H), 6.70 (d, J=9.0 Hz, 2H), 6.98 (d, J=9.0 Hz, 2H), 7.30 (d, 2H); FT-IR (KBr): ν=3340, 2912, 1630, 1510, 1364, 1217, 1089, 1005, 1035, 999, 806, 706 cm$^{-1}$; MS (NBA): m/z: 452.27 [M+H]$^+$;

Elemental analysis:
Calculated (%) for $C_{24}H_{37}NO_7$: C, 63.84; H, 8.26; N, 3.10.
Experimental: C, 62.15; H, 8.37; N, 3.30.

EXAMPLE 1 p-Dodecanoylamino phenyl glucopyranoside (3 mg) obtained in Production Example 1 and p-aminophenylglucopyranoside (3 mg) were dissolved in water-methanol mixed solvent (10:1, volume ratio, 1 ml) by heating the solution to 70° C. Next, tetraethoxysilane (20 mg) was added, and benzylamine (6 mg) was subsequently added.

A gel was obtained through gradual cooling and was allowed to stand without any additional treatment for seven days at room temperature without agitation. The sample was sintered in a nitrogen gas atmosphere first for two hours at 200° C. and subsequently for four hours at 500° C. to completely remove the organic material. As a result, a metal oxide micro structure material (metal oxide nanotubes) was obtained.

Figure 2:
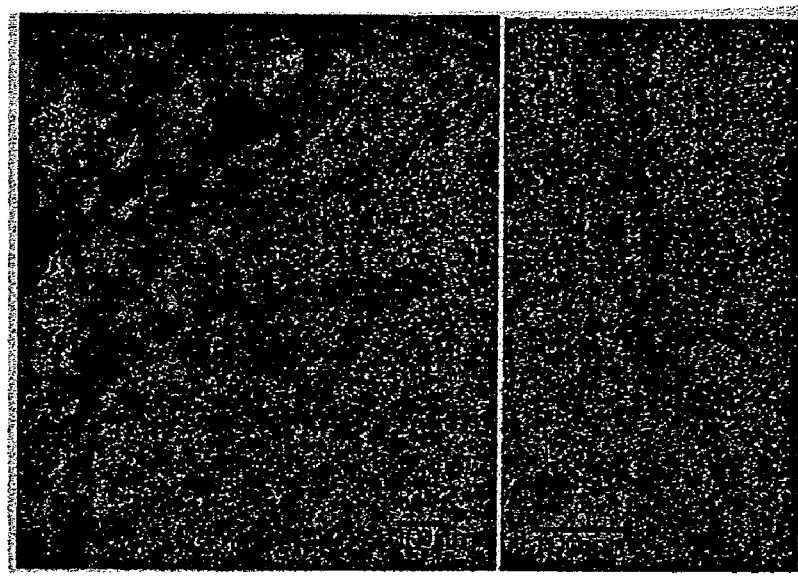
FIG. 2 shows a transmission type electron microscope photograph of the double spiral silica nanotubes obtained in Example 1.

The metal oxide nanotubes were examined using a transmission type electron microscope. A scanning electron microscope photograph is shown in FIG. 1, a transmission electron microscope photograph is shown in FIG. 2. Double spiral shaped fibers comprising two nanotubes were observed.

Figure 3:
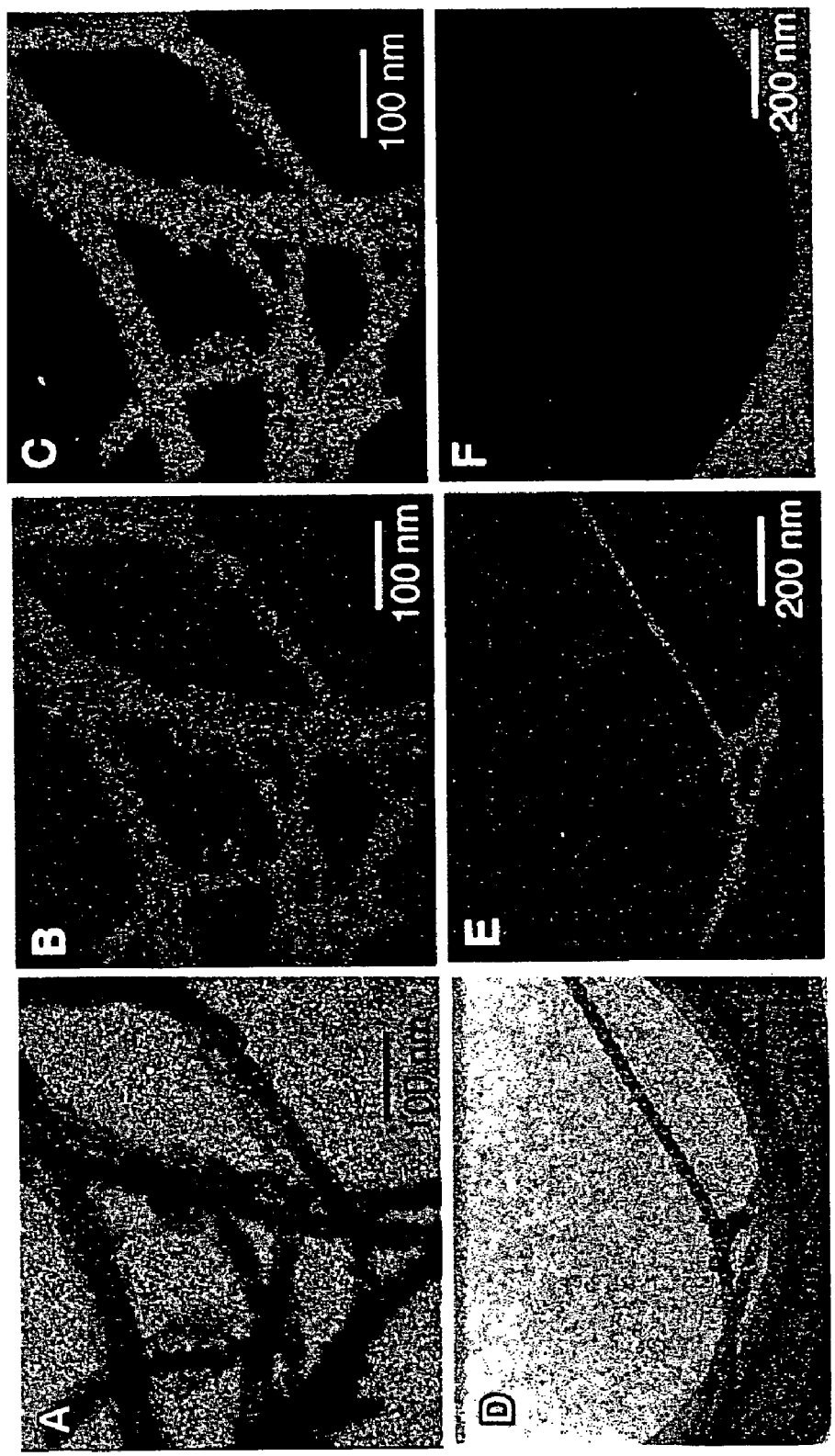
FIG. 3 shows a transmission type electron microscope photograph (an energy loss type spectrometer method) of the double spiral silica nanotubes obtained in Example 1 before and after sintering. (A) through (C) show the images before sintering, and (D) through (F) show the images after sintering. (A) and (D) show the images of an entire fiber, (B) and (E) show silicon element distribution diagrams and (C) and (F) show carbon (organic material) element distribution diagrams. The semicircles in the lower sections of (D) and (F) represent the vessels used in the measurements.

Furthermore, transmission type electron microscope photographs (energy loss type spectrometric method) of the double spiral silica nanotubes obtained before and after sintering are shown in FIG. 3. By conducting an electron microscope examination employing an energy loss type spectrometric method (for example, Japan Petrochemical Society Journal, Vol. 47, No. 10, pp. 197–203, 1998), element distribution diagrams of the nano structure for silicon and carbon were prepared. The presence of silicon (B) and carbon (that is, organic materials) (C) was confirmed prior to sintering (A-C), but the presence of only silicon (E) was confirmed (D-F) and no carbon (F) was detected after sintering. The results indicated that the organic material was completely removed from the template.

Figure 4:
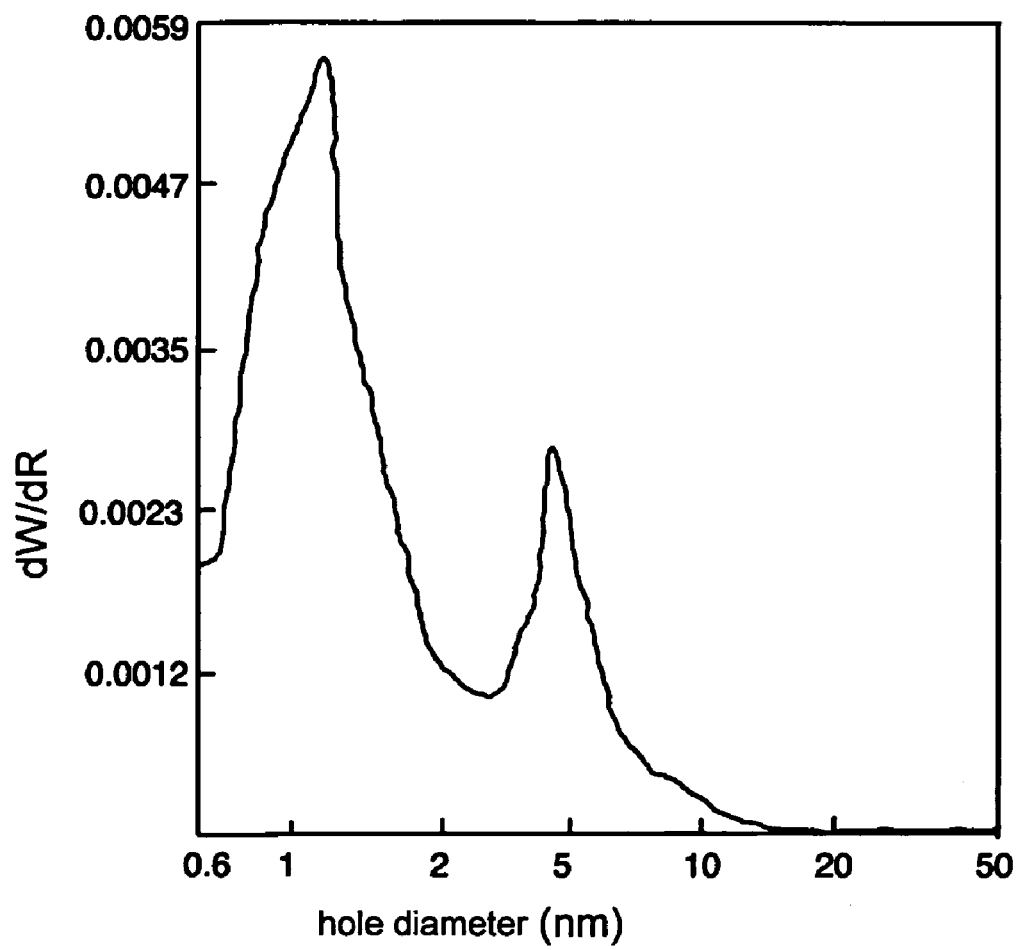
FIG. 4 shows a hole diameter distribution curve for the double spiral silica nanotubes obtained in Example 1.

Using the metal oxide nanotubes obtained, an adsorption—desorption isothermic curve for nitrogen gas was obtained using a Brunauer-Emmett-Teller (BET) method. That is, metal oxide nanotubes were completely degassed under high vacuum at 300° C. for 71 hours and were slowly cooled to room temperature. Next, a known amount of nitrogen gas was continuously added to the sample cell under liquid nitrogen temperature conditions (about −195° C.), and the pressure was measured. By repeating this procedure, adsorption isotherms were obtained. Similarly, desorption isotherms were obtained by measuring the amount of gas released from a sample when relative pressures were gradually lowered from one. The hole diameter size-volume curve shown in FIG. 4 was obtained.

As a result, two peak hole diameters (the peaks in the curve shown in FIG. 4) were observed, and the hole area in the metal oxide nanotubes was found to be 450–500 m/g. Of these two peak hole diameters (1.2–1.5 nm and about 5 nm), the hole diameter of 1.2–1.5 nm was attributed to the hollow cylinder present in the center of individual double spiral nanotubes and the hole diameter of about 5 nm was attributed to the nano space formed between two nanotubes.

Figure 5:
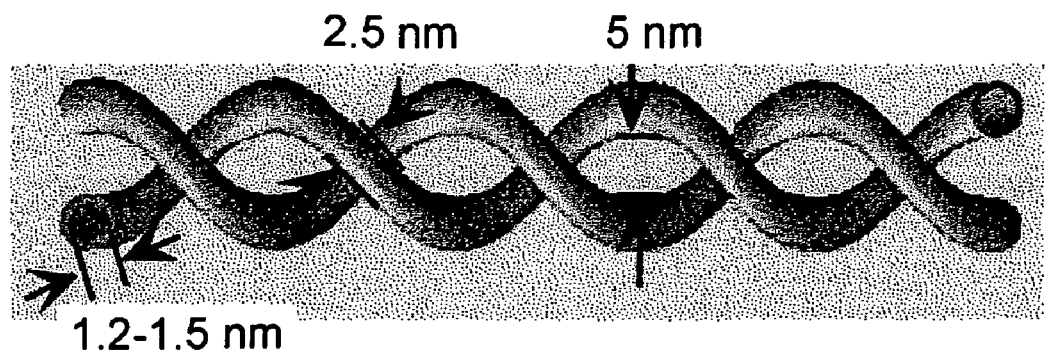
FIG. 5 shows the structure of the double spiral silica nanotubes obtained in Example 1.

Based on these results, the nanotubes were thought to be composed solely of a metal oxide and were thought to constitute double spiral (the distance between two nanotubes was about 5 nm) hollow cylinder shaped nanotubes having external diameters of about 2.5 nm, internal diameters of about 1.2–1.5 nm and lengths of several hundred micrometers as shown in FIG. 5.

Figure 6:
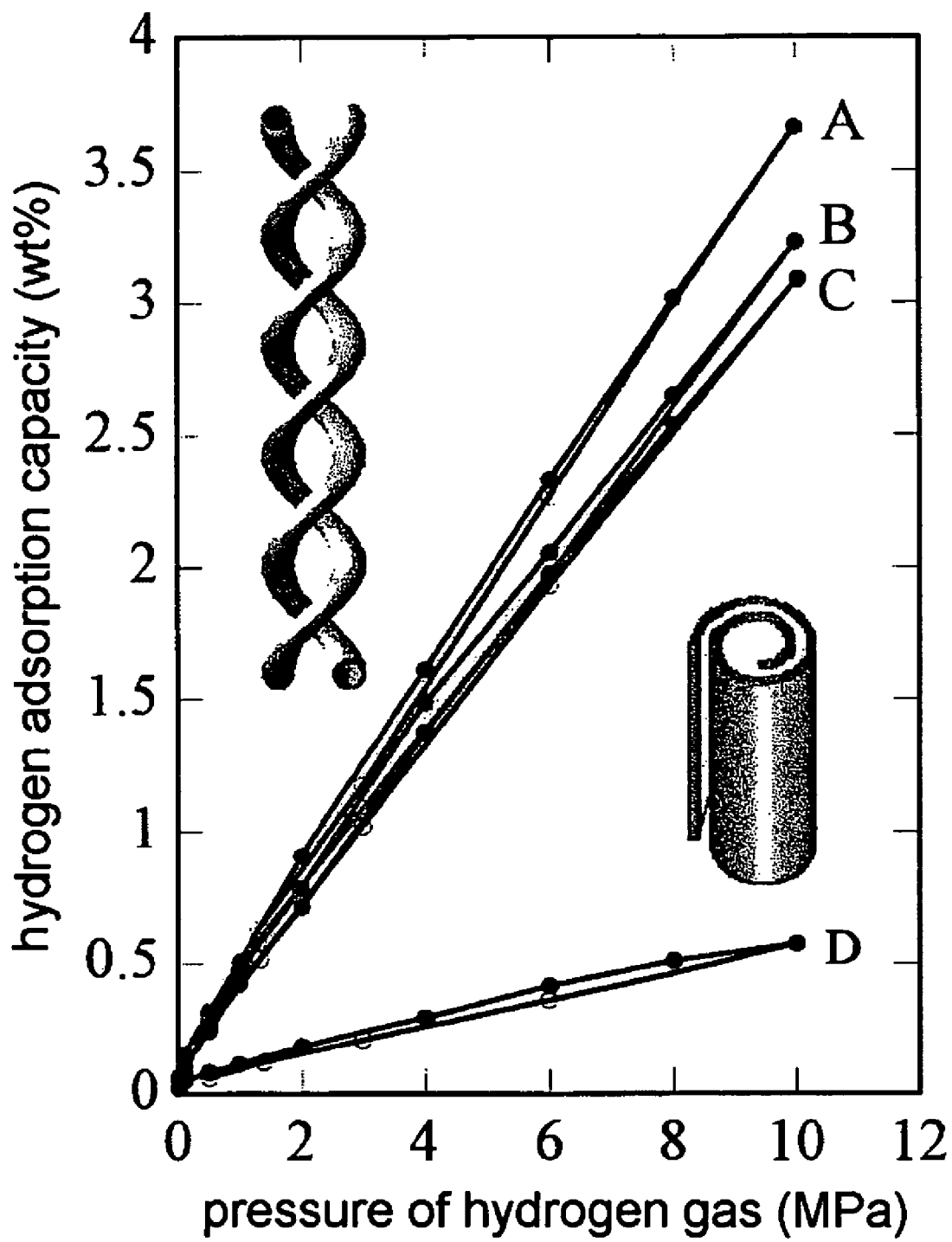
FIG. 6 shows hydrogen adsorption-desorption isothermal curves for the double spiral silica nanotubes and cylindrical silica obtained in Example 1. The nanotubes of Example 1 are shown in (A) through (C), and (A), (B) and (C) represent hydrogen adsorption-desorption isothermal curves at 273K, 288K and 298K, respectively. (D) shows hydrogen adsorption-desorption isothermal curves for the nanotubes of Comparative Example 1 at 298K.

In addition, the gas adsorption—desorption rate was calculated using the weight change rate observed when the metal oxide nanotubes obtained were completely degassed using the same method used to adsorb and desorb nitrogen gas, hydrogen gas was introduced at constant temperature by changing the pressure from 1 MPa to 10 MPa, and adsorption—desorption isothermic curves were obtained. The hydrogen adsorption—desorption isothermic curve of the double spiral silica nanotubes obtained in Example 1 is shown in FIG. 6.

The hydrogen adsorption capacity of the metal oxide nanotubes at 10 MPa and 273 K was 3.66% by weight (curve A). Similarly, the hydrogen adsorption capacity of the metal oxide nanotubes at 10 MPa and 288 K was about 3.22% by weight (curve B) and at 10 MPa and 298 K was about 3.0% by weight (curve C).

EXAMPLE 2 p-Dodecanoylamino phenylgalactopyranoside was used in place of p-dodecanoylamino phenylglucopyranoside in Example 1 and p-aminophenyl galactopyranoside was used in place of p-aminophenyl glucopyranoside to conduct the same operations described in Example 1, and similar double spiral silica nanotubes were obtained.

EXAMPLE 3 p-Tetradecanoylamino phenylglucopyranoside was used in place of p-dodecanoylamino phenylglucopyranoside in Example 1 to conduct the same operations described in Example 1, and, similarly, double spiral silica nanotubes were obtained.

EXAMPLE 4

Hexylamine was used in place of benzylamine in Example 1 to conduct the same operations described in Example 1, and, similarly, double spiral silica nanotubes were obtained.

COMPARATIVE EXAMPLE 1

A potassium complex was obtained by dissolving a gel forming agent (5 mg) containing cholesterol and diazacrown ether segments at both ends of the molecules in one gram of dichloromethane in the presence of an equimolar amount of potassium perchlorate. The potassium complex was added to 1-butanol (95 mg) containing tetraethoxy silane (15 mg) and benzylamine (6 mg), and the mixture was heated to facilitate dissolution. The solution was left standing for a day at room temperature. The gel obtained was dried in vacuum, and multilayered silica nanotubes having an internal diameter of about 300 nm to 500 nm were obtained by subsequently drying and sintering the gel for an hour at 200° C. and two hours at 500° C. under nitrogen gas atmosphere and further for four hours at 500° C. in air [J. H. Jung, Y. Ono, S. Shinkai, Langmuir, 16, 1643 (2000)].

The hydrogen adsorption and storage capacity of the multilayered silica nanotubes was evaluated and was found to be 0.58% by weight at 10 MPa and 298K. (FIG. 6, Curve D.)

The invention claimed is:

1. A metal oxide nanotube consisting solely of a metal oxide that may contain hydroxyl groups, which is constructed in a double spiral and a hollow cylinder and has a hole diameter distribution containing two peak hole diameters ranging from 1 to 2 nm and from 3 to 7 nm.

2. The metal oxide nanotube as in claim 1 wherein the metal is Si, Ti or Zr or mixtures thereof.

3. The metal oxide nanotube as in claim 1 being formed using spiral shaped fibers as a template, which are formed by dissolving compound 1 represented by chemical formula 1

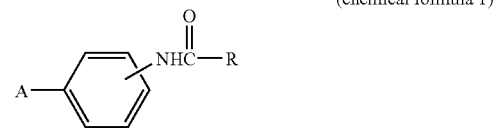

(chemical formula 1)

and compound 2 represented by chemical formula 2

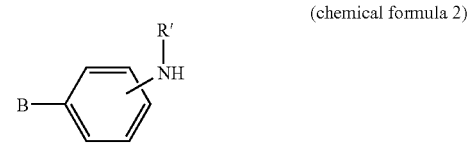

(chemical formula 2)

in water or a mixed solution of water and alcohol, wherein A and B represent saccharide radicals that may be identical or different from each other, R represents an alkyl group and R' represents a hydrogen atom or an alkyl group, and allowing the resulting solution to stand.

4. A gas adsorption and storage material comprising the metal oxide nanotube as in claim 1.

5. A hydrogen adsorption and storage material comprising the metal oxide nanotube as in claim 1.

6. A method for manufacturing a metal oxide nanotube comprising the steps of dissolving compound 1 represented by chemical formula 1

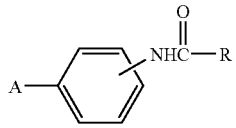

(chemical formula 1)

and compound 2 represented by chemical formula 2

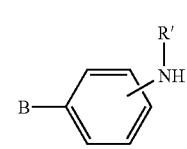

(chemical formula 2)

in water or a mixed solution of water and alcohol, wherein A and B represent saccharide radicals that may be identical or different from each other, R represents an alkyl group and R' represents a hydrogen atom or an alkyl group, allowing the resulting solution to stand, mixing further a metal oxide precursor and a catalyst for converting the metal oxide precursor into a metal oxide into the solution whereby a gel is formed, and sintering the gel.

7. The method as in claim 6 wherein the metal is Si, Ti or Zr or a mixture thereof.

8. The method as in claim 6 wherein the metal oxide precursor is an alkoxide of said metal.

9. The method as in claim 6 wherein compound 1 and compound 2 are dissolved in a mixed solution of water and an alcohol having four carbon atoms or less, and the content of alcohol in the mixed solution is 10 to 50% by weight.

10. The method as in claim 6 wherein the catalyst is a basic catalyst.

11. The method as in claim 6 wherein the ratio of compound 1 to the sum total of compounds 1 and 2 is 20 to 90 mol % and the ratio of metal in the metal oxide precursor to compound 1 is 10 to 150 fold equivalent.

12. The method as in claim 6 wherein A and B may be identical or different from each other and represent radicals obtained by removing hydrogen from any one of the hydroxyl groups bonded to an aldopyranose six membered ring.

13. The method as in claim 12 wherein the aldopyranose is glucopyranose or galactopyranose.

14. The method as in claim 6 wherein the alkanoylamino group (—NHCOR) of compound 1 is located in a para position to the saccharide radical A, the amino group (—NR'H) of compound 2 is located in a para position to the saccharide radical B, A and B are identical saccharide radicals, R is a linear alkyl group having six to twenty carbon atoms and R' is a hydrogen atom.

15. A metal oxide nanotube as in claim 2 being formed using spiral shaped fibers as a template, which are formed by dissolving compound 1 represented by the chemical formula 1

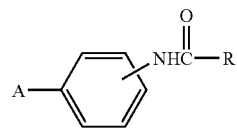

(chemical formula 1)

and compound 2 represented by chemical formula 2

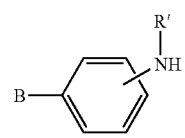

(chemical formula 2)

in water or a mixed solution of water and alcohol, wherein A and B represent saccharide radicals that may be identical or different from each other, R represents an alkyl group and R' represents a hydrogen atom or an alkyl group, and allowing the resulting solution to stand.

16. A gas adsorption and storage material comprising the metal oxide nanotube as in claim 2.

17. A gas adsorption and storage material comprising the metal oxide nanotube as in claim 3.

18. A gas adsorption and storage material comprising the metal oxide nanotube as in claim 15.

19. A hydrogen adsorption and storage material comprising the metal oxide nanotubes as in claim 2.

20. A hydrogen adsorption and storage material comprising the metal oxide nanotubes as in claim 3.

21. A hydrogen adsorption and storage material comprising the metal oxide nanotubes as in claim 15.

22. The method as in claim 7 wherein the metal oxide precursor is an alkoxide of said metal.

23. The method as in claim 22 wherein compound 1 and compound 2 are dissolved in a mixed solution of water and alcohol having four carbon atoms or less and the content of alcohol in the mixed solution is 10 to 50% by weight.

24. The method as in claim 23 wherein the catalyst is a basic catalyst.

25. The method as in claim 24 wherein the ratio of compound 1 to the sum total of the compounds 1 and 2 is 20 to 90 mol % and the ratio of metal in the metal oxide precursor to the compound 1 is 10 to 150 fold equivalent.

26. The method as in claim 25 wherein A and B may be identical or different from each other and represent radicals obtained by removing hydrogen from any one of the hydroxyl groups bonded to an aldopyranose six membered ring.

27. The method as in claim 26 wherein the aldopyranose is glucopyranose or galactopyranose.

28. The method as in claim 27 wherein the alkanoylamino group (—NHCOR) of compound 1 is located in a para position to the saccharide radical A, the amino group (—NR'H) of compound 2 is located in a para position to the saccharide B radical, A and B are identical saccharide radicals, R is a linear alkyl group having six to twenty carbon atoms and R' is a hydrogen atom.

* * * * *